United States Patent
Liang et al.

(10) Patent No.: US 7,460,890 B2
(45) Date of Patent: Dec. 2, 2008

(54) BI-MODAL RF ARCHITECTURE FOR LOW POWER DEVICES

(75) Inventors: Jie Liang, Plano, TX (US); Nathan R. Belk, Luca, TX (US)

(73) Assignee: Texas Instruments Incorporated, Dallas, TX (US)

( * ) Notice: Subject to any disclaimer, the term of this patent is extended or adjusted under 35 U.S.C. 154(b) by 414 days.

(21) Appl. No.: 11/191,721

(22) Filed: Jul. 28, 2005

(65) Prior Publication Data

US 2007/0026839 A1 Feb. 1, 2007

(51) Int. Cl.
H04B 1/38 (2006.01)
H04M 1/00 (2006.01)

(52) U.S. Cl. ............... 455/572; 455/343.1; 455/574

(58) Field of Classification Search ............... 455/574, 455/127.5, 69, 70, 67.11, 522, 67.13, 226.1–226.4, 455/343.1–343.5, 232.1–151.1
See application file for complete search history.

(56) References Cited

U.S. PATENT DOCUMENTS

| | | | | |
|---|---|---|---|---|
| 5,507,023 | A * | 4/1996 | Suganuma et al. | 455/234.1 |
| 5,907,798 | A * | 5/1999 | Abramsky et al. | 455/249.1 |
| 6,181,201 | B1 * | 1/2001 | Black | 330/129 |
| 6,498,926 | B1 * | 12/2002 | Ciccarelli et al. | 455/240.1 |
| 6,748,200 | B1 * | 6/2004 | Webster et al. | 455/234.1 |
| 6,842,478 | B1 * | 1/2005 | Ogino | 375/147 |
| 7,099,641 | B2 * | 8/2006 | Bruckmann et al. | 455/232.1 |
| 2003/0119463 | A1 * | 6/2003 | Lim | 455/245.1 |
| 2004/0023680 | A1 * | 2/2004 | Hulvey | 455/522 |
| 2004/0077324 | A1 * | 4/2004 | Wieck | 455/234.1 |
| 2005/0009490 | A1 * | 1/2005 | Lee et al. | 455/245.1 |
| 2005/0276359 | A1 * | 12/2005 | Xiong | 375/345 |
| 2006/0178163 | A1 * | 8/2006 | Richards et al. | 455/522 |
| 2007/0111673 | A1 * | 5/2007 | Otaka et al. | 455/76 |
| 2007/0147554 | A1 * | 6/2007 | Yoshida | 375/345 |

* cited by examiner

*Primary Examiner*—Simon D Nguyen
(74) *Attorney, Agent, or Firm*—Steven A. Shaw; W. James Brady; Frederick J. Telecky, Jr.

(57) ABSTRACT

A wireless receiver is provided that includes a component and a power control logic 80. The component is operable to receive a wireless signal and process the wireless signal in at least one of a first mode and a second mode. The first mode uses less power than the second mode. The power control logic 80 is operable based on a characteristic of the wireless signal to promote processing the wireless signal by the component in the at least one of the first and second modes. A method for a wireless receiver to process the wireless signal to reduce power consumption is also provided. The method includes determining a characteristic of the wireless signal, and selecting one of a first and second modes in which to process the signal based on the characteristic of the wireless signal.

7 Claims, 2 Drawing Sheets

BI-MODAL RF ARCHITECTURE FOR LOW POWER DEVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to radio frequency signal reception. More particularly, embodiments of the present invention decrease the amount of power consumed by radio frequency signal reception devices used in wireless networking.

BACKGROUND OF THE INVENTION

A wireless computing network typically comprises one or more wireless access points and one or more wireless clients. The access points might be physically connected to a standard wired network and might transmit data from the network over short distances via radio frequency signals. The clients may be, for example, but are not limited to, laptop computers. A reception device within a client receives a signal from an access point, converts the signal to digital data, and delivers the data to the client. Thus, the radio frequency signals are used to provide data much as the data cables in wired networks.

As wireless networks, such as those specified in the IEEE 802.11 family of standards, become more prevalent, the amount of power consumed by the devices used in such networks can become a concern. Among the factors that can affect the power consumption of wireless reception devices are biasing, phase noise, filtering, and the analog-to-digital data conversion process.

Biasing refers to a current or voltage used within an electronic circuit in order to allow the active devices within that circuit to perform their desired functions. The greater the amount of biasing used in a circuit, the more power the circuit typically uses. Phase noise refers to any random time distortions within a signal that is intended to be periodic. More power is typically required when less phase noise is desired in a device. Filters are used in some devices to block unwanted adjacent signals. Wireless communication standards typically define the maximum signal power allowed unwanted adjacent interfering channels. Generally, the more filters that are used by a device, the more power that is required by that device.

In analog-to-digital conversion, a particular number of digital bits are typically needed to represent a particular analog signal. The greater the data transmission rate of the signal and the more interference there is in the signal due to undesired adjacent signals relative to the strengths of the desired signal, the greater the number of bits that are needed. A greater amount of power is needed for a large number of bits than for small number of bits.

SUMMARY OF THE INVENTION

According to one embodiment, a wireless receiver is provided that includes a component and power control logic. The component is operable to receive a wireless signal and process the wireless signal in at least one of a first mode and a second mode. The first mode uses less power than the second mode. The power control logic is operable based on a characteristic of the wireless signal to promote processing the wireless signal by the component in at least one of the first and second modes.

An alternative embodiment provides a method for processing by a wireless receiver a wireless signal to reduce power consumption. The method includes determining the characteristics of the wireless signal, and selecting one of a first and second modes in which to process the signal based on the characteristic of the wireless signal. The first mode uses less power than the second mode. The method includes processing the wireless signal in the selected one of the first mode and second mode.

In another embodiment, a bi-modal RF receiver configured to reduce power consumption is provided. The bi-modal RF receiver includes a low noise amplifier, a phase locked loop, a multi-stage baseband filter, an analog-to-digital converter, and a power control logic component. The low noise amplifier has a first and second modes each operable for biasing an analog circuit processing a wireless signal. The first mode provides lower biasing and consumes less power than the second mode. The phase locked loop is connected to a mixer and to the low noise amplifier and has a first mode of low phase noise and second mode of high phase noise. The first mode of low phase noise of the phased locked loop consumes more power than the second mode of high phase noise. The multi-stage baseband filter is coupled to receive the wireless signal and is operable in a first mode for bypassing or in some way power reducing at least one stage of the multi-stage baseband filter to reduce power consumption by the multi-stage baseband filter. The multi-stage baseband filter is operable in a second non-bypass higher power mode to consume more power but to provide better rejection or filtering of undesired adjacent signals. The analog-to-digital converter is in communication with the multi-stage baseband filter. The analog-to-digital converter is operable in a first mode to conserve power by adjusting the number of digital bits used when converting the wireless signal from analog. In a second mode, the analog-to-digital converter uses more digital bits and consumes more power. The power control logic component monitors both the desired and the undesired wireless signals and, based on a characteristic of the wireless signal, reduces power consumption for processing the wireless signal. The power control logic component promotes use of the first modes of one or more of the low noise amplifier, the phase locked loop, the multi-stage baseband filter, and analog-to-digital converter.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

In various embodiments, systems and methods are provided that decrease the amount of power consumed by a radio frequency (RF) signal reception device. In an embodiment, the device is used in a network compliant with the IEEE 802.11 standard for wireless networking. Several of the components in the architecture of an RF reception device are adapted to operate in a bi-modal fashion. Based on data rate, signal strength, noise, the levels of adjacent undesired signals, and other factors, the components can be placed in a low power mode or a high power mode as appropriate. In this way, the power consumption of the RF receiver scales with channel conditions and decreased power consumption can be achieved. This can be contrasted with RF architectures where a single mode of operation is designed to accommodate the worst-case scenario operating conditions.

Figure 1:
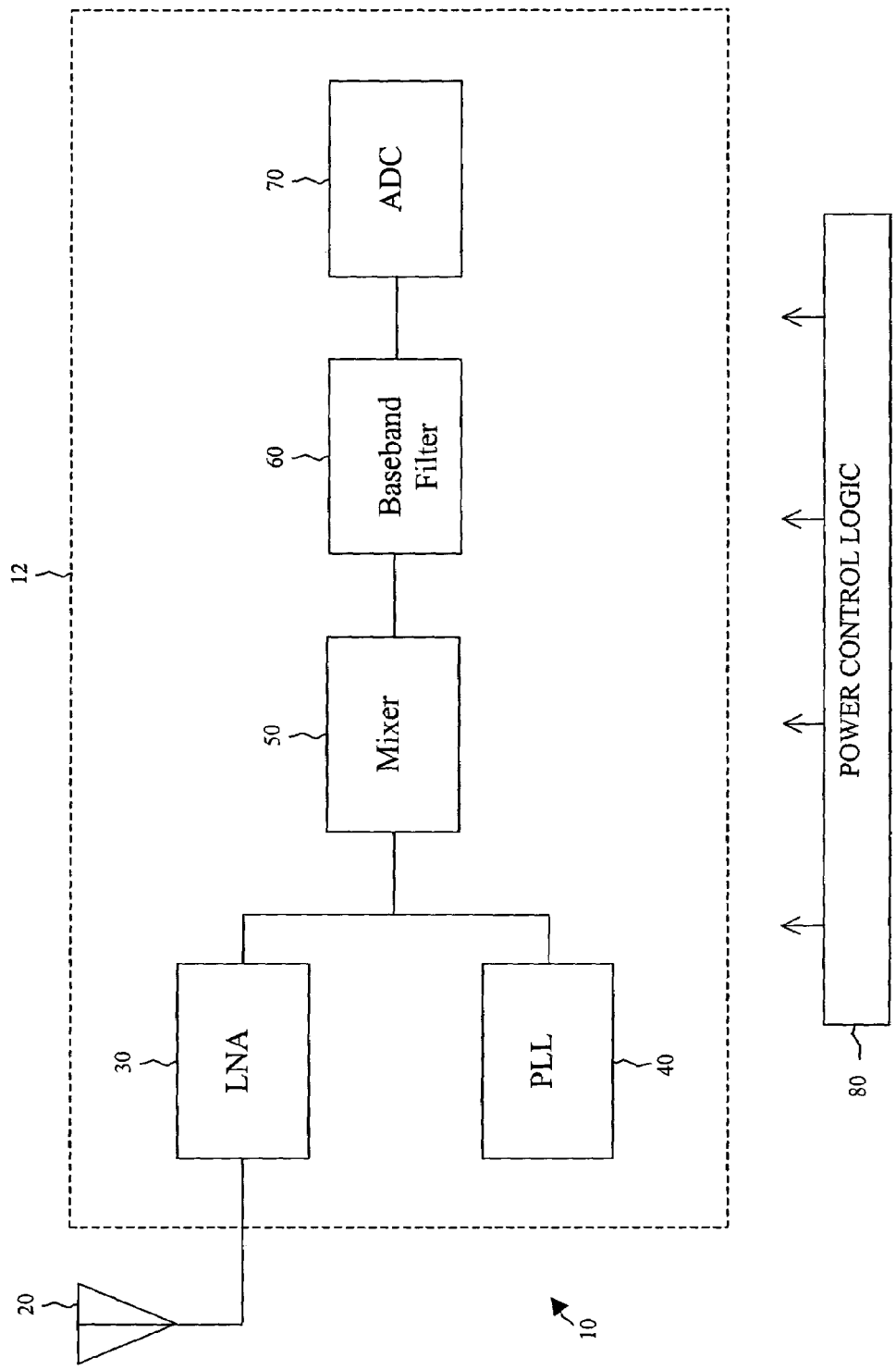
FIG. 1 is a block diagram of an embodiment of a system for decreasing the power consumption of a receiving device in a wireless network.

FIG. 1 shows an embodiment of a system 10 for decreasing the power consumption of an RF reception device that might be found in a wireless network client. In one embodiment, several components in the system 10 may be embedded in an integrated circuit chip 12. An antenna 20, which may be outside the chip 12, receives an RF signal from a transmitting device, such as an access point, and injects the signal into the chip 12.

Within the chip 12, a low noise amplifier (LNA) 30 receives and amplifies the RF signal. A phase locked loop (PLL) 40 contains a controlled oscillator which generates a sinusoidal wave of a precise frequency. The signals from the LNA 30 and the PLL 40 are combined in a mixer 50 to produce an output signal with a frequency that is the difference in the frequencies of the two input signals. This output signal is passed through a baseband filter 60 that might include variable gain amplifiers, low-pass filters, and other components. The baseband filter 60 can perform further amplification and can selectively suppress unwanted signals with frequencies outside a specified frequency range. From the baseband filter 60, the signal is passed to an analog-to-digital converter (ADC) 70, which converts the RF signal to digital data that can be processed by the device in which the chip 12 is present or to which the system 10 is coupled.

In an embodiment, a power control logic component 80 analyzes the signals that pass through the components in the chip 10 and modifies the power consumption characteristics of each component based on this analysis. More specifically, the power control logic component 80 adjusts the power consumption of the LNA 30, the PLL 40, the baseband filter 60, and the ADC 70 between a low power mode and a high power mode for each component. The adjustment is based on the strength of the wanted input signal, the strength of unwanted signals in adjacent bands, the rate of data transmission, the amount of noise in the signal, and other factors as discussed below.

In the LNA 30, power consumption and biasing typically have a linear relationship, where the greater the biasing, the greater the power consumption. When the dynamic range of an input signal is large, a large amount of biasing, and a correspondingly large amount of power, is typically needed by the LNA for proper function. Varying the LNA bias in response to the desired signal strength is a well established art. However, substantial benefits can be gained both in terms of power efficiency and signal to noise margin or signal to distortion margin for a particular transmission code if signal parameters such as the desired signal strength, the strengths of interfering signals and the standard mandated maximum undesired signal levels are utilized to determine optimum bias levels.

When the combined input signal is very weak, the biasing can be optimized entirely for low LNA noise. In an embodiment, the power control logic component 80 monitors the input signal strength and, when the total input signal strength is not high, moves the biasing in the LNA 30 to its level for optimum noise. If the signal strength increases, the power control logic component 80 will often move the biasing in the LNA 30 to a higher level, thus placing the LNA 30 in a high power mode.

Placing the LNA 30 in the low power mode by decreasing the biasing decreases the dynamic range that can be allowed in the input signal. If there is a strong signal in an adjacent channel, the adjacent channel signal can interfere with the input signal and possibly saturate the LNA 30. To prevent this interference, the power control logic component 80 detects the adjacent signals and increases the biasing in the LNA 30 if the signals in adjacent channels are too strong. This places the LNA 30 in the high power mode.

Depending on the details of the LNA design including the process technology chosen for its active devices, the biasing can strongly affect the noise injected into the signal when it passes through the LNA 30. When the input signal is weak, perhaps in the range of 5 dB to 25 dB above the thermal noise floor, the LNA 30 typically needs to have low noise, as measured by a parameter known as the signal-to-noise ratio (SNR) margin. In an embodiment, the power control logic component 80 monitors the SNR margin and switches the LNA 30 to the low noise power mode when the SNR margin is low and to the low power mode when the SNR margin is high and the blocker power is comparable to or lower than the desired power, and to the high power mode when the neighboring undesired signals are 20 dB to 40 dB stronger than the desired signals.

In one embodiment, the current in the LNA 30 in the high power mode is approximately 6 milliamps (mA) and in the low power mode is approximately 2 mA. With this difference of 4 mA between the two modes, the power reduction between the two modes can be calculated as 4 mA times 1.5 volts (the LNA circuit voltage) times 1.2, which equals 7.2 milliwatts (4 mA*1.5 V=6 mW).

An important operational parameter for the PLL 40 is phase noise. Any part of the output signal from the PLL 40 that is not at the desired frequency is considered phase noise. The amount of power consumed by the PLL 40 is typically related to the phase noise. When a low level of phase noise is desired, a greater amount of power is needed. If a greater amount of phase noise can be tolerated, a lower amount of power might be used. Existing PLL designs maintain the power consumption at a constant, high level to keep the phase noise at a constant low level.

In some cases, more phase noise will be tolerable. In an embodiment, the power control logic component 80 monitors the channel conditions and determines when a greater level of phase noise can be tolerated. When more phase noise is tolerable, the power control logic component 80 lowers the power consumption of the PLL 40, thus increasing the phase noise produced by the PLL 40. When channel conditions indicate that the phase noise needs to be decreased, the power control logic component 80 raises the power consumption of the PLL 40, thus decreasing the phase noise produced by the PLL 40.

To make this determination, the power control logic component 80 considers both the signal to noise margin of the desired signal and the presence of nearby tone jammers when controlling the power consumption of the PLL 40. A tone jammer is very narrow band interference, such as noise generated by industrial machinery. When the phase noise is high, a tone jammer will have a greater impact on the performance of the PLL 40. In an embodiment, the power control logic component 80 confirms that there are no strong tone jammers nearby before switching to the low power consumption mode.

The use of a lower power PLL 40 might require that a second divide chain be used in the PLL 40. One divider could be used for the high power mode and one for the low power mode and the power control logic component 80 could switch between them as needed.

In one embodiment, the power consumed by the PLL 40 in the high power mode is approximately 44 milliamps (mA) and in the low power mode is approximately 30 mA. With this difference of 14 mA between the two modes, the actual power reduction between the two modes can be calculated as 14 mA times 1.2, which is approximately 17 mW (14 mW*1.2=16.8 mW).

The baseband filter 60 typically contains a three-stage low pass filter, where each stage provides some amount of attenuation of the undesired signals coming out of the mixer 50 relative to the desired signals. Often the level of the desired signal is increased by each successive stage of the filter while the undesired signals are reduced. This signal typically has a frequency up to about 10 MHz. Components of the signal above 10 MHz can be considered noise and/or undesired interference.

Existing baseband filters are configured to handle strong signals at frequencies greater than 10 MHz. For example, a filter can provide 60 dB of relative attenuation at 20 MHz. Such a high level of attenuation is not necessary when the incoming signal to a baseband filter contains no strong signals at high frequencies. In an embodiment, the power control logic component 80 monitors the signal entering the baseband filter 60 and, when the high-frequency undesired signal strength is comparable to or lower than the desired signal, causes the signal to bypass one or two of the filter stages in the baseband filter 60.

When the undesired signal is 20 dB to 30 dB lower than the desired signal, only minimal undesired signal attenuation is needed, two filters can be bypassed and only one stage of the three filter stages in the baseband filter 60 is used. If a greater amount of attenuation is needed, one filter can be bypassed and two stages of the three filter stages in the baseband filter 60 are used. For the highest level of attenuation, all three stages are used as in the previously existing designs. For each filter stage that is bypassed, the power consumed by the baseband filter 60 is decreased. When one or more filters are bypassed, the baseband filter 60 is in a low power mode and when no filters are bypassed, the baseband filter 60 is in a high power mode.

When one or more filtering stages are turned off, there is less attenuation of adjacent channel interference. In an embodiment, the power control logic component 80 monitors the strength of the signals in adjacent channels and allows bypassing of filters only when low signal strengths are detected on the adjacent channels.

In one embodiment, the power consumed by a single filter in the baseband filter 60 is approximately 5 mW. When two filters are bypassed, the power reduction compared to the high power mode, where no filters are bypassed, is 10 mW. The actual power reduction can be calculated as 10 mW times 1.2, which equals 12 mW (10 mW*1.2=12 mW).

The power consumption of the ADC 70 depends on the number of bits needed to fully repressent the information in an incoming analog signal. Fewer bits require less power. The number of bits needed depends on the incoming data rate the detailed nature of the incoming signal such as peak to average ratio and on the signal-to-noise ratio of the incoming signal. When the data rate is high and/or the levels of incompletely filtered undesired blockers are high relative to the desired signal, a relatively large number of bits are needed to represent the signal digitally. When the data rate and the noise level are both low and the desired signal at the input of the converter is strong compared to the undesired signals, the signal can be represented with fewer bits.

Existing ADC designs specify that a constant number of bits be used for the analog-to-digital conversion regardless of the data rate, peak to average ratio undesired signal strength and noise level of the incoming signal. For example, an ADC design that provides a data rate of 54 Mbps with a 20 dB signal-to-noise ratio will be set to use 10 bits.

In an embodiment, the power control logic component 80 monitors the signal entering the ADC 70 and, when the data rate and the noise level are both low, decreases the number of bits used by the ADC 70 to represent the signal. This places the ADC 70 in a low power mode. If the data rate or the noise level increases, the power control logic component 80 increases the number of bits the ADC 70 uses to represent the signal, thus placing the ADC 70 in a high power mode.

Interference from adjacent channels can increase the dynamic range of the input signal to the ADC 70. An increased dynamic range can require an increase in the number of bits needed to model the signal. In an embodiment, the power control logic component 80 monitors the strength of the signals in adjacent channels and adjusts the number of bits used by the ADC 70 based on the adjacent channel signal strengths.

In one embodiment, the power consumed by the ADC 70 in the high power mode is approximately 90 mW and in the low power mode is approximately 20 mW. With this difference of 70 mW between the two modes, the actual power reduction between the two modes can be calculated as 70 mW times 1.2, which equals 84 mW (70 mW*1.2=84 mW).

The power control logic component 80 makes appropriate adjustments to the power consumed by the LNA 30, the PLL 40, the baseband filter 60, and the ADC 70 based on channel conditions. Adjustments can be made to each of those components individually or to various combinations of those components. In some cases, an adjustment to one component might affect the power consumption of one or more other components. The power control logic component 80 can intelligently make appropriate adjustments to all impacted components so that the overall power consumption of all of the components combined is at the lowest level that will allow proper processing of the incoming signal.

As an example, the amount of noise in the input signal can affect the power consumed by the LNA 30 and by the ADC 70. The power control logic component 80 might allow more noise in the LNA 30 by decreasing its power consumption and, correspondingly, might increase the number of bits used by the ADC 70 so that the ADC 70 can handle the additional noise. The decrease in power used by the LNA 30 might offset the increase in power needed by the ADC 70 to handle the extra bits. Alternatively, the power control logic component 80 might determine that more power can be saved by decreasing the noise allowed in the LNA 30 and decreasing the number of bits used by the ADC 70. One of skill in the art will recognize that the power control logic component 80 might minimize overall power consumption by making many other such tradeoffs among the power consumed by the LNA 30, the PLL 40, the baseband filter 60, and the ADC 70.

In FIG. 1, a single power control logic component 80 monitors and controls the power consumption in the LNA 30, the PLL 40, the baseband filter 60, and the ADC 70. In an alternative embodiment, separate power control logic components are coupled to each of those components. That is, one power control logic component monitors and controls the power consumption strictly in the LNA 30, another power control logic component performs those functions in the PLL 40, another in the baseband filter 60, and another in the ADC 70. In an embodiment, the separate power control logic components can communicate with one another and adjust the power consumption in their associated components so that the overall power consumption in the system 10 is at or near a minimum.

Figure 2:
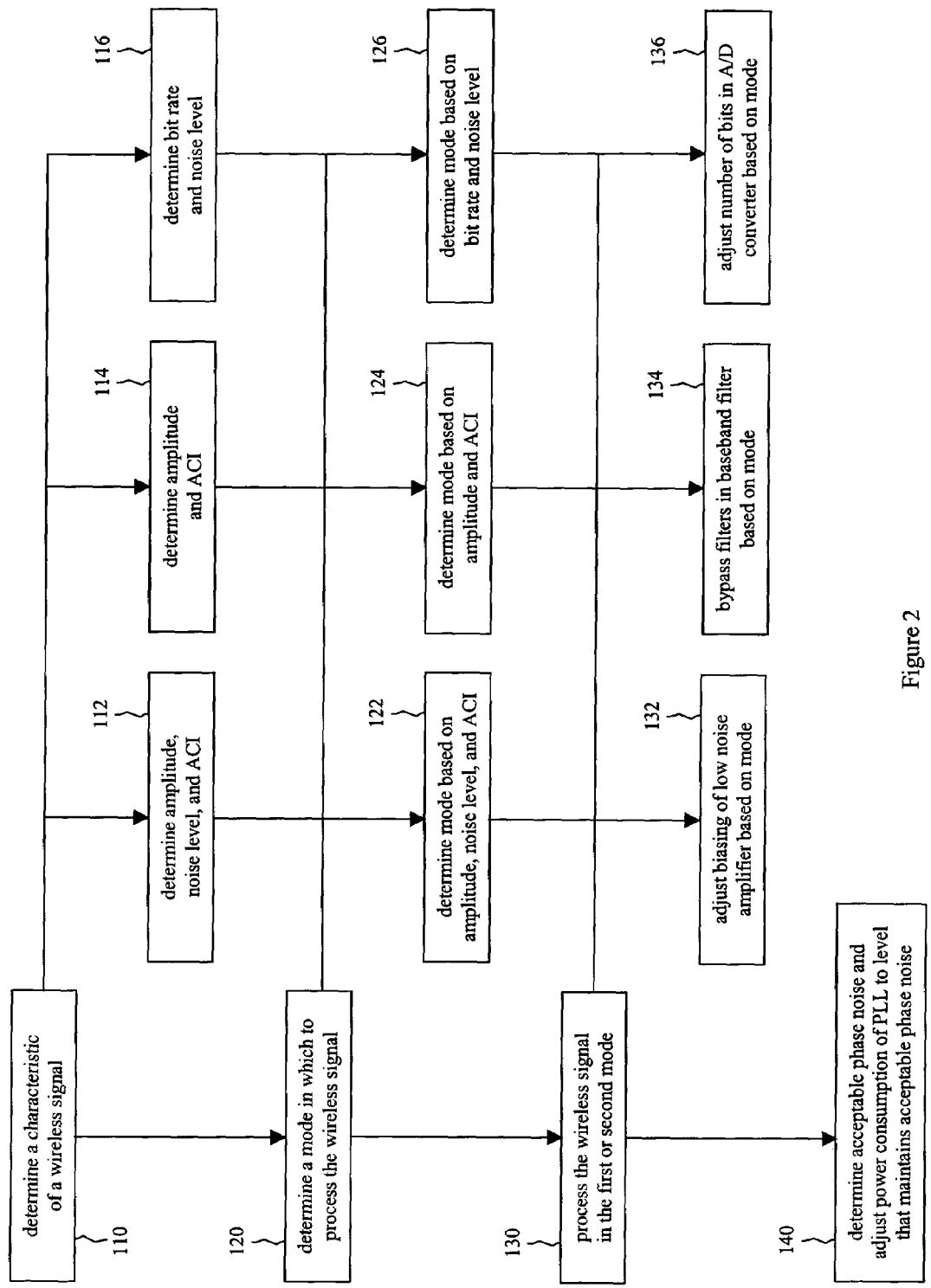
FIG. 2 is a flowchart of an embodiment of a method for decreasing the power consumption of a receiving device in a wireless network.

FIG. 2 illustrates a method for processing a wireless signal to reduce power consumption. In box 110, a characteristic of the wireless signal is determined. Typical characteristics might include, but are not limited to, amplitude, frequency, noise level, signal-to-noise ratio, dynamic range, bit rate, and adjacent channel interference. In box 120, a mode in which to process the signal is determined based on one or more of the characteristics. More power is consumed in one mode than in another mode. In box 130, the signal is processed in one of the modes.

Processing of the signal can be done by one or more components and the determination of the characteristic 110, determination of the mode 120, and processing of the signal 130 can vary based on which component is processing the signal. The determination of the characteristic 110 is more specifically embodied in box 112, where the component is a low noise amplifier, in box 114, where the component is a baseband filter, and in box 116, where the component is an analog-to-digital converter. The determination of the mode 120 is more specifically embodied in boxes 122, 124, and 126. The processing of the signal 130 is more specifically embodied in boxes 132, 134, and 136.

In other words, the actions shown in boxes 112, 122, and 132 are taken when the component is a low noise amplifier. The actions shown in boxes 114, 124, and 134 are taken when the component is a baseband filter. The actions shown in boxes 116, 126, and 136 are taken when the component is an analog-to-digital converter.

When the component is a low noise amplifier, the determination of a characteristic comprises determining the amplitude, noise level, and adjacent channel interference in the signal, as shown in box 112. The determination of a mode comprises the selection of one of at least two power consumption modes based on the amplitude, noise level, and adjacent channel interference, as shown in box 122. The processing of the signal in one of the modes comprises adjusting the biasing of the low noise amplifier based on the selected mode, as shown in box 132.

When the component is a baseband filter, the determination of a characteristic comprises determining the amplitude and adjacent channel interference in the signal, as shown in box 114. The determination of a mode comprises the selection of one of at least two power consumption modes based on the amplitude and adjacent channel interference, as shown in box 124. The processing of the signal in one of the modes comprises bypassing zero or more filters in the baseband filter based on the selected mode, as shown in box 134.

When the component is an analog-to-digital converter, the determination of a characteristic comprises determining the bit rate and noise level in the signal, as shown in box 116. The determination of a mode comprises the selection of one of at least two power consumption modes based on the bit rate and noise level, as shown in box 126. The processing of the signal in one of the modes comprises adjusting the number of bits used in the analog-to-digital converter based on the selected mode, as shown in box 136.

An additional action can be taken in box 140, where the power consumption of a phase locked loop used in the processing of the signal can be adjusted. The amount of phase noise in a signal produced by a phase locked loop can be kept to a minimum if a large amount of power is provided to the phase locked loop. As the power decreases, the phase noise tends to increase. In box 140, an acceptable level of phase noise is determined and, when the acceptable level of phase noise can be maintained in a low power consumption mode, the phase locked loop is placed in the low power consumption mode. In a preferred embodiment, the power consumption is adjusted to the lowest level that maintains an acceptable level of phase noise.

While several embodiments have been provided in the present disclosure, it should be understood that the Bi-Modal RF Architecture for Low Power Devices may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What we claim as our invention is:

1. A method for processing by a wireless receiver a wireless signal to reduce power consumption, the method comprising:

determining a characteristic of the wireless signal;

selecting one of a first and second modes in which to process the signal based on the characteristic of the wireless signal, the first mode using less power than the second mode;

processing the wireless signal in the selected one of the first mode and second mode;

determining a bit rate and a noise level of the wireless signal as the wireless signal enters an analog-to-digital converter, the analog-to-digital converter operable to process the wireless signal; and when the bit rate and the noise level are below a threshold, processing the wireless signal in the first mode, wherein the first mode provides for using fewer bits in the analog-to-digital converter than the second mode.

2. The method of claim 1, wherein determining the characteristics of the wireless signal include determining information including a desired signal strength relative to a signal strength of an undesired signal, and further wherein processing is further defined as biasing based on the information and based on a signal-to-noise level of the desired signal.

3. The method of claim 1, further comprising:

determining an amplitude, a noise level, and an adjacent channel interference level of the wireless signal as the wireless signal enters a low noise amplifier, the low noise amplifier operable to process the wireless signal; and when the amplitude, the noise level, and the adjacent channel interference level are below a threshold, processing the wireless signal in the first mode, wherein the first mode provides for lower biasing in the low noise amplifier than the second mode.

4. The method of claim 1, further comprising:

determining an amplitude and an adjacent channel interference level of the wireless signal as the wireless signal enters a multi-stage baseband filter, the multi-stage baseband filter operable to process the wireless signal; and when the amplitude and the adjacent channel interference level are below a threshold, processing by the multi-stage base-band filter the wireless signal in the first mode, wherein the first mode provides for bypassing at least one stage of the multi-stage baseband filter.

5. A bi-modal RF receiver configured to reduce power consumption, comprising:

a low noise amplifier having a first and second modes operable for biasing an analog circuit processing a wireless signal, the first mode providing lower biasing and consuming less power than the second mode;

a phase locked loop in communication with the low noise amplifier and having a first mode of low phase noise and second mode of high phase noise, the first mode of low phase noise of the phased locked loop consuming more power than the second mode of high phase noise;

a multi-stage baseband filter coupled to receive the wireless signal and operable in a first mode for bypassing at least one stage of the multi-stage baseband filter to reduce power consumption by the multi-stage baseband filter, the multi-stage baseband filter operable in a second non-bypass mode to consume more power;

an analog-to-digital converter in communication with the multi-stage baseband filter, the analog-to-digital converter operable in a first mode to conserve power by adjusting the number of digital bits used when converting the wireless signal from analog and operable in a second mode to use more digital bits and consume more power; and a power control logic component to monitor the wireless signal and, based on a characteristic of the wireless signal, to reduce power consumed to process the wireless signal by promoting use of the first modes of one or more of the low noise amplifier, the phase locked loop, the multi-stage baseband filter, and analog-to-digital converter.

6. The bi-modal RF receiver of claim 5, wherein the power control logic component is operable to promote use of the first modes of the low noise amplifier, phase locked loop, baseband filter, and analog-to-digital converter where the power logic component detects that the characteristic of the wireless signal is such that processing by the first mode is sufficient to process the wireless signal.

7. The bi-modal FW receiver of claim 6, wherein when the power logic component detects that the characteristic of the wireless signal is such that processing by the second mode is necessary to process the wireless signal, the power control logic component operable to promote use of the second modes of the low noise amplifier, phase locked loop, baseband filter, and analog-to-digital converter.

* * * * *